United States Patent
Walsh (10) Patent No.: US 9,699,438 B2
(45) Date of Patent: Jul. 4, 2017

(54) 3D GRAPHIC INSERTION FOR LIVE ACTION STEREOSCOPIC VIDEO

(75) Inventor: Peter Walsh, Bristol, CT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 657 days.

(21) Appl. No.: 12/829,580

(22) Filed: Jul. 2, 2010

(65) Prior Publication Data
US 2012/0002014 A1    Jan. 5, 2012

(51) Int. Cl.
H04N 13/02    (2006.01)
H04N 13/00    (2006.01)
G06T 19/00    (2011.01)

(52) U.S. Cl.
CPC ......... *H04N 13/007* (2013.01); *G06T 19/006* (2013.01); *H04N 13/004* (2013.01); *H04N 13/0239* (2013.01); *H04N 13/0242* (2013.01)

(58) Field of Classification Search
None
See application file for complete search history.

(56) References Cited

U.S. PATENT DOCUMENTS

| | | | |
|---|---|---|---|
| 5,748,199 A * | 5/1998 | Palm | H04N 13/0014 345/419 |
| 5,892,554 A | 4/1999 | DiCicco et al. | |
| 5,912,700 A | 6/1999 | Honey et al. | |
| 6,020,891 A * | 2/2000 | Rekimoto | G06F 3/04815 345/157 |
| 6,133,946 A | 10/2000 | Cavallaro et al. | |
| 6,167,356 A | 12/2000 | Squadron et al. | |
| 6,229,550 B1 | 5/2001 | Gloudemans et al. | |
| 6,266,100 B1 | 7/2001 | Gloudemans et al. | |
| 6,292,130 B1 | 9/2001 | Cavallaro et al. | |
| 6,304,665 B1 | 10/2001 | Cavallaro et al. | |
| 6,456,232 B1 | 9/2002 | Milnes et al. | |
| 6,466,275 B1 | 10/2002 | Honey et al. | |
| 6,477,267 B1 | 11/2002 | Richards | |
| 6,512,892 B1 * | 1/2003 | Montgomery et al. | 396/326 |
| 6,597,406 B2 | 7/2003 | Gloudemans et al. | |
| 6,657,584 B2 | 12/2003 | Cavallaro et al. | |
| 6,728,637 B2 | 4/2004 | Ford et al. | |
| 6,744,403 B2 | 6/2004 | Milnes et al. | |
| 6,864,886 B1 | 3/2005 | Cavallaro et al. | |

(Continued)

FOREIGN PATENT DOCUMENTS

WO    WO 2008115222 A1 *   9/2008
WO    WO2008115222 A1       9/2008

(Continued)

OTHER PUBLICATIONS

[Online], [retrieved Nov. 30, 2012], Video World, "First and Ten", URL: http://www.plsn.com/current-issue/26-video-world/3565-first-and-ten.html, Dec. 2008.*

(Continued)

*Primary Examiner* — Ulka Chauhan
*Assistant Examiner* — Patrick F Valdez
(74) *Attorney, Agent, or Firm* — McCormick, Paulding & Huber LLP (57) ABSTRACT

Systems and methods for the insertion of graphics into stereoscopic live action 3D video using image models taking into account positional data from the stereoscopic camera rig.

22 Claims, 4 Drawing Sheets

(56) References Cited

U.S. PATENT DOCUMENTS

| | | | |
|---|---|---|---|
| 6,909,438 | B1 | 6/2005 | White et al. |
| 6,965,397 | B1 | 11/2005 | Honey et al. |
| 6,965,699 | B2* | 11/2005 | Jeong ............... H04N 13/0011 348/E13.025 |
| 7,075,556 | B1 | 7/2006 | Meier et al. |
| 7,116,342 | B2 | 10/2006 | Dengler |
| 7,154,540 | B2* | 12/2006 | Honey et al. ............... 348/222.1 |
| 7,230,653 | B1 | 6/2007 | Overton et al. |
| 7,341,530 | B2 | 3/2008 | Cavallaro et al. |
| 7,542,034 | B2 | 6/2009 | Spooner et al. |
| 8,085,320 | B1* | 12/2011 | Khan ..................... H04N 5/217 348/208.6 |
| 8,243,123 | B1* | 8/2012 | Geshwind .......... H04N 13/0022 348/42 |
| 8,265,422 | B1* | 9/2012 | Jin ................................ 382/275 |
| 8,446,433 | B1* | 5/2013 | Mallet ..................... G06T 5/006 345/581 |
| 2002/0044153 | A1* | 4/2002 | Hoch et al. .................... 345/647 |
| 2004/0104935 | A1* | 6/2004 | Williamson et al. .......... 345/757 |
| 2004/0155877 | A1* | 8/2004 | Hong et al. .................... 345/419 |
| 2005/0093891 | A1* | 5/2005 | Cooper ......................... 345/649 |
| 2007/0156017 | A1 | 7/2007 | Lamprecht |
| 2007/0167702 | A1 | 7/2007 | Hasser et al. |
| 2007/0236514 | A1* | 10/2007 | Agusanto ........... A61B 1/00193 345/646 |
| 2008/0002041 | A1* | 1/2008 | Chuang et al. ............... 348/241 |
| 2008/0117290 | A1* | 5/2008 | Mazza ............... H04N 13/0296 348/47 |
| 2010/0050082 | A1* | 2/2010 | Katz ..................... H04N 5/272 715/719 |
| 2010/0272417 | A1* | 10/2010 | Nagasawa et al. ............. 386/97 |
| 2010/0295945 | A1* | 11/2010 | Plemons et al. ............. 348/148 |
| 2012/0092454 | A1* | 4/2012 | Tourapis ............ H04N 13/0003 348/43 |
| 2012/0099836 | A1* | 4/2012 | Welsh .................. H04N 13/004 386/230 |

FOREIGN PATENT DOCUMENTS

| | | | |
|---|---|---|---|
| WO | WO 2009000906 | A1 * | 12/2008 |
| WO | WO 2009006273 | A2 * | 1/2009 |
| WO | WO2009083863 | A1 | 7/2009 |

OTHER PUBLICATIONS

[Online], [retrieved Nov. 30, 2012], Kienzle, C. "NFL Enters a New Dimension", URL: http://www.tvtechnology.com/feature-box/0124/nfl-enters-a-new-dimension, Jan. 5, 2009.*

Park, et al "Virtual Control of Optical Axis of the 3DTV Camera for Reducing Visual Fatigue in Stereoscopic 3DTV", ETRI Journal, 26(6), Dec. 2004.*

[Online], [retrieved Nov 30, 2012], "Stereo 3D Workflow with SI-3D files", URL: http://www.iridas.com, 2009.*

Toshihiko, M. "Image Extraction Technology Applied to Sports Programs", Broadcast Technology, No. 21, p. 21, 2005.*

Fehn, C. "A 3D-TV Approach Using Depth-Image-Based Rendering (DBIR), Proc. 3rd IASTED Conf. on Visualization, Imaging, and Image Processing, Benalmedena, Spain, pp. 482-487, Sep. 2003."*

Guerchouche et al "Accurate Camera Calibration Algorithm Using a Robust Estimation of the Perspective Projection Matrix", Proc. SPIE 6315, Mathematics of Data/Image Pattern Recognition, Compression, and Encryption with Applications IX, 63150D, Aug. 25, 2006.*

Shah et al, "Intrinsic Parameter Calibration Procedure for a (High-Distortion) Fish-Eye Lens Camera with Distortion Model and Accuracy Estimation", Pattern Recognition, 29(11), pp. 1775-1788, 1996.*

Morvan Y., "Acquisition, Compression and Rendering of Depth and Texture for Multi-View Video", PhD Thesis, Chapter 2.2, Eindhoven Univ. of Technology, The Netherlands, Apr. 2009.*

Becker et al, "Semiautomatic 3-D Model Extraction from Uncalibrated 2-D Camera Views", Proc. SPIE Visual Data Exploration and Analysis II, vol. 2410, pp. 447-461, 1995.*

Brown D.C., "Decentering Distortion of Lenses", Photogrammetric Engineering and Remote Sensing, 24:555-66, 1996.*

Piatti et al, "A virtual simulator for photogrammetry", International Archives of Photogrammetry, Remote Sensing and Spatial Information Sciences, 36(5), 2006.*

Roth G., "Camera Calibration", [online], [retrieved Aug. 26, 2015], http://people.scs.carleton.ca/~c_shu/Courses/comp4900d/notes/camera_calibration.pdf, 2006.*

Allison et al, "The Camera Convergence Problem Revisited", Stereoscopic Displays and Virtual Reality Systems XI, Proc. of SPIE-IS&T Electronic Imaging, vol. 5291, pp. 167-178, 2004.*

* cited by examiner

FIG. 1

FIG. 2a
Channel 1
(duplicate for each channel)

FIG. 2b

3D GRAPHIC INSERTION FOR LIVE ACTION STEREOSCOPIC VIDEO

BACKGROUND OF THE INVENTION

Field of the Invention

The present invention relates generally to the production of real-time three dimensional live video.

Description of the Related Art

All references cited in this specification, and their references, are incorporated by reference herein where appropriate for teachings of additional or alternative details, features, and/or technical background.

Sporting event broadcasting has increasingly made use of graphic objects overlaid on two-dimensional (2D) video production streams, such as with NASCAR car tracking and with American football first and ten lines. The graphic insertion content can be static or dynamic and may include boundary lines, such as the "ten yard line," hand drawn graphics, such as Madden notes and depictions, ball indicators and more. The graphics are targeted to the viewing audience to provide an improved viewing experience.

With the growing popularity of three-dimensional (3D) motion pictures, presentation of live sporting events in 3D is sought as a desirable new format. In a 3D presentation the viewer becomes immersed in the environment in a manner, and with a sensation, not attainable with standard two dimensional viewing. Technology commonly used in the presentation of 3D motion pictures relies on the separation of images presented to each eye by the use of polarized filtering glasses having different filters for each eye. The left eye filter blocks content intended for the right eye while a right eye filter blocks content intended for the left eye. Various alternative methods for filtering are also available such as active glasses alternately shuttering the image to each eye as the images are turned on and off. In this manner the human brain combines the images to form the illusion of three dimensional space and objects.

Previously, graphic content has been inserted at predetermined (possibly multiple) specific depths using fixed parallax of the graphic elements. The 3D television production format aided by the insertion of 3D graphics into the 3D stereoscopic video stream has been not been solved. There is currently no method or system capable of inserting 3D graphics into a live stereoscopic video stream for broadcasting in such a manner that the perceived location of the 3D graphics corresponds with the perceived location of the scene being viewed. As three-dimensional viewing becomes more popular, there exists a need to accurately acquire, supplement, produce and broadcast live events in 3D overcoming all the short comings of current production methods used to insert graphics into 3D video content streams.

SUMMARY OF THE INVENTION

There is a need for inserting graphics into stereoscopic content for applications such as the first and ten line for football. Technology innovations are required to insert these graphic elements in a manner which maintains the illusion of the graphics being located at defined positions in the 3D space being shot by stereoscopic camera rigs.

The challenge of inserting graphics into a stereoscopic live action video stream can be understood in terms of three different scenarios: 1) computer graphic 3D stereoscopic content creation, 2) insertion of graphics into traditional 2D live action video, and 3) insertion of graphics into stereoscopic 3D live action video.

Computer generated (CG) 3D stereoscopic content is created by defining two virtual cameras for which a scene is rendered for each camera's perspective. The inter-optical distance can be matched to the inter-ocular distance to create realistic 3D stereoscopic perception or it can be different to create unrealistic but dramatic effects. Since the two stereoscopic views are synthesized and computer generated graphic elements are not being mixed with live action video shot with a stereoscopic camera rig, this scenario is the "ideal" situation which does not encounter the issues associated with insertion of 3D graphics into live action video.

The insertion of graphics into traditional 2D live action video requires precise correspondence between the graphic elements and the scene being viewed by the camera. This, in turn, requires graphic elements be generated by a virtual camera whose image formation properties match those of the real camera creating the video. A camera model needs to be employed that represents all of relevant image formation characteristics and that this camera model tracks the actual camera's image formation characteristics in real time. Any errors between the virtual camera model and the actual camera can cause disparity between the graphic elements and the actual scene being shot which breaks the illusion of the graphic elements actually being a part of the real scene.

For an idealized camera, the virtual camera model should match the location, orientation, and optical magnification of the real camera. Furthermore, the virtual camera should also match all the real camera image formation characteristics which include optical distortion (typically radial distortion), image sensor mounting in the camera relative to the optics (typically tangential distortion), and accurately model the kinematics of camera mounting and control and systematic measurement errors in the instrumentation of the camera kinematics and optics. Any errors in modeling and representation of these characteristic can result in shifting or scaling of graphics relative to the actual scene (real situs).

There are additional challenges to insert graphics into 3D live action stereoscopic video content. These challenges can be understood by reviewing the process of creating stereoscopic 3D content for live action using stereoscopic camera rigs.

Depth is perceived due to parallax created between the offset views of a scene by our left and our right eyes. The distance to an object being viewed, in combination with our inter-ocular distance, creates a retinal disparity which our brains have learned to use to perceive depth. The inter-ocular distance is defined as that distance between our eyes. The stereoscopic camera rig used to acquire the two video streams for stereoscopic 3D content have an inter-optical separation which, as with CG stereoscopic, can match our inter-ocular distance or can be varied to create unrealistic but dramatic effects. When stereoscopic content is viewed on a movie or television screen, the amount of parallax between the views of an object can make it appear in the plane of the screen (zero parallax), behind it (positive parallax) or in front of it (negative parallax).

Parallel cameras create zero parallax at infinite distance causing the entire scene to appear to be in front of the viewed screen. Cameras can be angled to create toe-in causing the scene at a specific distance to appear to be in the plane of the viewing screen. However, toe-in can result in perspective transformations which create non-uniform disparity including vertical disparity. The disparity results in an incorrect stereoscopic effect, which is not a naturally occurring characteristic when viewed with our horizontally displaced eyes. The non-uniform disparity may cause discomfort to the viewer. As an alternative to using toe-in, the images can be translated horizontally to create the desired depth perception for the screen distance. In such an embodiment, the image sensors can be horizontally translated relative to the optics, or by processing the video streams subsequent to the image formation process.

In an embodiment, insertion of graphics into stereoscopic live action 3D video is performed for each video channel and performed in a manner which accurately models the image formation process used by the stereoscopic camera rig. In addition to the issues associated with inserting graphics into live action 2D video, all the additional image formation characteristics previously described for the stereoscopic image formation process is modeled and accurately acquired to generate graphic content which corresponds to the video content being created by the stereoscopic camera rig and it's associated processing.

In practice a broadcast production may utilize internal designs or any number of possible external vendors' camera rigs for shooting the live action stereoscopic content. The insertion of graphics into stereoscopic live action 3D video entails the generation of graphics for each channel of the stereoscopic content using virtual camera models which represent the image formation process of the stereoscopic rig and any of its associated processing equipment. Insertion can be configured and adapted for alternative embodiments of stereoscopic camera rig techniques.

In one embodiment, insertion of the graphic is performed after the physical image formation process through which a virtual camera model comprises a representation of all of the camera characteristics of the single camera image formation process collected and modeled in an Image Formation Model. Exemplary inclusions into the virtual camera model are camera toe-in, interoptical separation, and horizontal displacement. In one embodiment, any post image formation horizontal translation of the video streams deemed necessary occurs after the graphic insertion stage. In such an embodiment, the graphic elements locations are tied to the physical 3D object locations before any subsequent parallax offsets are introduced. This results in parallax offset application occurring uniformly to both real and virtual elements.

In another embodiment, the video stream may receive full 2D spatial remapping of the entire video streams prior to the graphic insertion. Under such remap processing the remapped stream can be incorporated into the virtual camera model used for generating the graphical elements. The remapping can additionally be used to compensate for deficiencies in the design of any particular stereoscopic camera rig. For example, the remapping process may be used with respect to a stereoscopic camera rig using toe-in. Such use creates keystoning of the video channels resulting in selective vertical disparity that may be unacceptable for high quality stereoscopic content. The remapping can be used to compensate for the keystoning, creating high quality stereoscopic video content and allowing the graphic insertion to be done to a more ideal set of conditions. Further exemplary uses of the remapping process may be to correct for optical distortion and to correct for sensor misalignment. The effects of optical distortion and sensor misalignment are typically seen as radial and tangential distortion respectively. These effects can be corrected through the use of the remapping process. This can be applied independently to each camera/lens of the stereoscopic pair and uniquely for each such stereoscopic camera head being used.

In an embodiment, there is provided a method comprising: obtaining a three-dimensional model of a real situs; obtaining two or more actual video stream channels of images of the real situs from two or more laterally-displaced digital cameras directed at the real situs, along with camera positional data with respect to the orientation of the two or more cameras with respect to the situs and inter-camera positional data with respect to the orientation of the two or more cameras with respect to one another the data including at least inter-optical separation and horizontal displacement; processing separately each of the two or more actual video stream channels in one or more data processors along with the camera orientation positional data to identify a common background area within each image of each of the actual video streams; obtaining a computer-generated virtual image of a target area within the real situs using the three-dimensional model and the positional data from the two or more cameras feeding the real video-streams; inserting the computer-generated virtual image of the target area into each of the images of each of the actual video stream channels into at least a portion of the common background area in common position to a physical object in each of the images in the actual video streams, wherein the virtual image does not exist within the real situs, to form two or more blended actual-virtual video streams; and combining the actual-virtual video stream channels and, using the inter-camera positional data, horizontally translating the same with respect to one another based upon desired parallax offset to form a 3D blended actual-virtual image combined video stream. Optionally, the three-dimensional model of a real situs is obtained prior to the obtaining of the two or more actual video stream channels of images. In an alternative embodiment the three-dimensional model of a real situs is obtained after the obtaining of the two or more actual video stream channels of images. In a further embodiment, the common position to a physical object relates to the position of the graphic to a reference object found in each image. Further exemplary variations may result in the target area is an area in the real situs which is important to the situs. In further exemplary variations to the embodiment, the target area is stationary or the target area is mobile.

In yet another embodiment, there is provided a method comprising: obtaining two or more actual video stream channels of images of a real situs from two or more laterally-displaced digital cameras directed at the real situs, along with camera positional data with respect to the orientation of the two or more cameras with respect to the situs and inter-camera positional data with respect to the orientation of the two or more cameras with respect to one another the data including at least inter-optical separation and horizontal displacement; processing separately each of the two or more actual video stream channels in one or more data processors along with the camera orientation positional data to identify a common background area within each image of each of the actual video streams; obtaining a computer-generated virtual graphic; inserting the computer-generated virtual graphic into each of the images of each of the actual video stream channels into at least a portion of the common background area in common position to a physical object in each of the images in the actual video streams, wherein the virtual graphic does not exist within the real situs, to form two or more blended actual-virtual video streams; and combining the actual-virtual video stream channels and, using the inter-camera positional data, horizontally translating the same with respect to one another based upon desired parallax offset to form a 3D blended actual-virtual image combined video stream. Optionally, the common position to a physical object relates to the position of the graphic to a reference object in each image. In an alternative embodiment, the cameras are selected from at least one of the group consisting of: electronic field production camera, remote camera, and electronic news gathering camera.

In yet another embodiment there is provided a method comprising: obtaining two or more actual video stream channels of images of a real situs from two or more laterally-displaced digital cameras directed at the real situs, along with camera positional data with respect to the orientation of the two or more cameras with respect to the situs and inter-camera positional data with respect to the orientation of the two or more cameras with respect to one another the data including at least inter-optical separation and horizontal displacement; processing separately each of the two or more actual video stream channels in one or more data processors along with the camera orientation positional data to form a virtual camera model of each; identifying a common background area within each virtual camera model; obtaining a computer-generated virtual graphic; inserting the computer-generated virtual graphic into each of the actual video streams based upon the virtual camera model in a portion of the common background area in a common position to a physical object in each of the actual video streams, wherein the virtual graphic does not exist within the real situs; and combining the actual video streams and, using the inter-camera positional data, horizontally translating the same with respect to one another based upon desired parallax offset to form a 3D blended actual-virtual image combined video stream. Optionally, the common position to a physical object relates to the position of the graphic to a reference object in each image. In an alternative embodiment the cameras are selected from at least one of the group consisting of: electronic field production camera, remote camera, and electronic news gathering camera.

In an embodiment there is provided a system comprising: two or more laterally-displaced digital cameras directed at a real situs, the cameras configured to acquire video stream images; at least two camera image formation data processors each operatively associated with one of the two or more laterally-displaced digital cameras, the image formation data processors operatively configured to determine image formation attributes of the two or more cameras with respect to a reference point; a comparator operatively associated with each of the cameras, the comparator operatively configured to detect the relative position of each camera with respect to other cameras in three dimensional space; at least two image formation modules operatively associated with each of the laterally-displaced cameras, the image formation module operatively configured to generate a model of the real situs as viewed through the camera to which it is associated; a graphic synthesizer operatively associated with the image formation modules, the graphic synthesizer operatively configured to generate graphics; and a keyer operatively associated with the graphic synthesizer and receiving video stream image feed from a camera, the keyer operatively configured to obtain a graphic from the graphic synthesizer and to place the same within a common background area in common position to a physical object in each of the images in the actual video streams and to combine the graphic-actual video streams to form a three-dimensional video output. In an alternative embodiment the system may further comprise: an offset parallax module operatively associated with the keyer the offset parallax module operatively configured to use the inter-camera positional data to horizontally translate the same with respect to one another based upon desired parallax offset. In an alternative embodiment the system may further comprise: at least one 2D remapping module operatively associated with each of the cameras the 2D remapping module operatively configured to correct optical distortions in the acquired video stream images of each of the cameras before processing by the keyer. In an alternative embodiment the system may further comprise: a computer operatively associated with the graphic synthesizer, the computer being operatively connected to a graphic database comprising numerous pre-defined graphics. In an alternative embodiment the system may further comprise: a computer user interface operatively associated with the computer, the interface operatively configured to alter input and output from the computer. Optionally the cameras are selected from least one of the group consisting of: an electronic field production camera, remote camera, and electronic news gathering camera. In an exemplary embodiment, the image formation data processors are video analyzers. In another exemplary embodiment, the image formation data processors are instrument signal processors. In a further exemplary embodiment, the image formation attributes are determined via a combination of formation data from a video analyzer and a instrument signal processor.

In one embodiment, a computer program may be provided via product in a network comprising a computer useable medium readable by a digital processing apparatus and tangibly embodying a program of instructions comprising computer readable program code executable by the digital processing apparatus to perform method steps comprising: processing two or more actual video stream channels, each produced by a different camera, along with the camera image formation data to form a virtual camera model of each actual video stream channel; identifying a common background area within each virtual camera model; inserting a computer-generated virtual graphic into each of the actual video streams based upon the virtual camera models, the graphics being inserted into a portion of the common background area in a common position to a physical object in each of the actual video streams, wherein the virtual graphic does not exist within the real situs; and combining the actual video streams and, using the inter-camera positional data, horizontally translating the same with respect to one another based upon desired parallax offset to form a 3D blended actual-virtual image combined video stream.

BRIEF DESCRIPTIONS OF DRAWINGS

Embodiments of the invention are illustrated in the accompanying drawings in which.

DETAILED DESCRIPTION OF THE INVENTION

Disclosed in embodiments herein is a method and system for a insertion of computer graphic objects into stereoscopic content for use in live 3D video streaming production and broadcast.

Graphic elements are added to video image streams to enhance a video production and add to the overall viewing experience of a viewer. Graphics can include, among others, first down line markers, object trackers, dynamic marking tools and telemetry interfaces. Object trackers, shown as icons on the screen, can include parameterized models that viewers see tracking players, race cars, footballs, hockey pucks, golf balls and the like. The tracker icon may be modeled so as to remain keyed in one place on the screen or alternatively to move with the object being tracked or move so as to avoid covering predetermined objects, such as a player's body or particularly the head of a player or participant. Similarly, a tracker icon for a race car might be modeled to follow a vehicle wherein the icon remains stationary on the screen and a tail follows the vehicle on acquired video image. Movements may as well be in a predetermined fashion to avoid covering or blocking certain aspects of the video image, such as the race car itself or other graphical elements displayed on the image. Icon movements may also be dynamically based on mathematical models of objects in the video image in real time. Such movement may be by way of artificial intelligence to again avoid obscuring some portion of the video image.

We perceive depth because of the parallax created between the views of a scene by our left and our right eyes. The distance to an object being viewed, in combination with our inter-ocular distance, creates a retinal disparity which our brains have learned to use to perceive depth. The stereoscopic camera rig used to acquire the two video streams for stereoscopic 3D content have an inter-optical separation which can be made to match our inter-ocular distance or can be varied to create unrealistic but dramatic effects. When we view stereoscopic content on a movie or television screen, the amount of parallax between the views of an object can make it appear in the plane of the screen (zero parallax), behind it (positive parallax) or in front of it (negative parallax).

Parallel cameras create zero parallax at infinite distance causing the entire scene to appear to be in front of the viewed screen. The cameras can be angled to create toe-in in order to cause the scene at a specific distance to appear to be in the plane of the viewing screen. Unfortunately, this has side effects of the perspective transformations which create non-uniform disparity including vertical disparity. This does not occur naturally when we view a scene with our eyes that are horizontally displaced. This can cause discomfort and incorrect stereoscopic effect. As an alternative to using toe-in, the images can be translated horizontally to create the desired depth perception for the screen distance. This can be done by translating the image sensors relative to the optics or by processing the video streams subsequent to the image formation process.

The solution entails the generation of graphics for both channels of the stereoscopic content using virtual camera models which represent the image formation process of the stereoscopic rig and any of its associated processing equipment. The solution is configurable in order to be applicable for a number of alternative stereoscopic camera rig techniques since an implementation may utilize internal designs or any number of possible external vendors' camera rigs for shooting the live action stereoscopic content.

The insertion of graphics into stereoscopic live action 3D video advantageously should be done for both video channels and in a manner which accurately models the image formation process used by the stereoscopic camera rig. In addition to all of the issues associated with inserting graphics into live action 2D video, all of the additional image formation characteristics outlined above for the stereoscopic image formation process must also be modeled and accurately acquired to generate graphic content which corresponds to the video content being created by the stereoscopic camera rig and it's associated processing.

The insertion technique is performed "after" the physical image formation process (i.e., incorporating into the virtual camera model which is designed to represent the image formation process) which includes a representation of all of the camera characteristics of the single camera image formation process including information such as camera toe-in, inter-optical separation, and horizontal displacement. Any post image formation horizontal translation of the video streams occurs "after" the graphic insertion stage. As a result, the graphic elements locations are tied to the physical 3D object locations before any subsequent parallax offsets are introduced. This assures that such parallax offsets are applied uniformly to both real and virtual elements.

In an embodiment, full 2D spatial remapping is performed to the entire video streams prior to the graphic insertion. This can be applied independently to each camera/lens of the stereoscopic pair and uniquely for each such stereoscopic camera head being used. The remapping may, of course, also be incorporated into the virtual camera model used for generating the graphical elements. The remapping can be used to compensate for deficiencies in the design of any particular stereoscopic camera rig being used. For example, the remapping feature, may be advantageously employed with respect to stereoscopic camera rigs using toe-in wherein a keystone effect of the frame image to each video channel may result in selective vertical disparity that may be unacceptable for high quality stereoscopic content. A further exemplary use of the remapping process may be to correct for optical distortion and to correct for sensor misalignment. The remapping allows for the graphic insertion to be done to a more ideal set of conditions. The effects of optical distortion and sensor misalignment are typically seen as radial and tangential distortion respectively.

Multiple techniques used to produce and display three-dimensional images are available. Display methods common for projecting stereoscopic image "pairs" to the viewer include: analglyphic, polarization, alternative-frame sequencing, and autostereoscopic display. The use of stereoscopic cameras has become the most widely used system for obtaining and presenting three-dimensional video images. Capturing video stream pairs traditionally dictates cameras be mounted side by side at some defined distance apart. The distance may be that of the human eyes, known as the intraocular distance, or some alternative distance. The cameras may be toed-in, pointing the camera at a given point of intersection some distance in space in front of the lens pair. The degree of toe-in dictates, among other properties, where the viewer will perceive the image to appear relative to the presentation screen surface.

While the description of the various embodiments might describe processing of an image or graphic to be inserted into an image, it is to be understood this description is, or can be applied to, a video stream, wherein the video stream is dynamic, having images that may change in real time.

Figure 1:
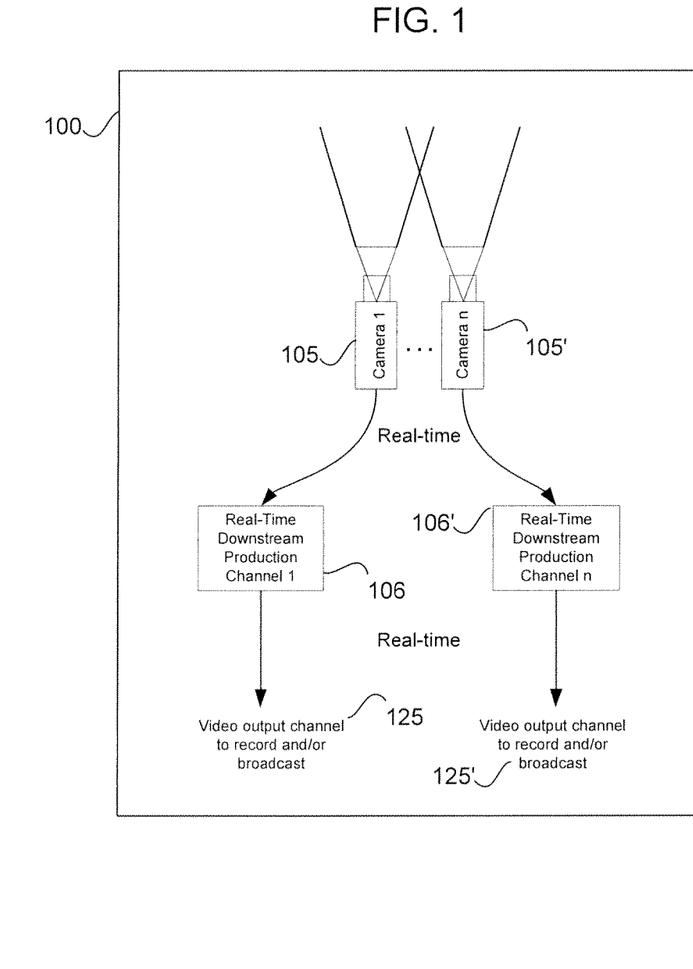
FIG. 1 is an exemplary block diagram illustrating a multi-camera real-time three-dimensional video production system.

Turning to the embodiment shown in FIG. 1, a three dimensional stereoscopic live action video system 100 comprises two cameras 105-105', real-time downstream production systems 106-106' and the resultant video output channels 125-125' to record and/or broadcast the resulting real-time combined video and graphic stream. An exemplary system employs a stereoscopic camera rig composed of two cameras, a left channel and a right channel and real-time acquisition downstream production systems and subsystems. Additional configurations can be envisioned wherein three or more cameras on one rig are employed to supply additional features and content to the video production subsystem.

Camera's useful in embodiments can be one of various types including, but not limited to, studio cameras, Electronic News Gathering "ENG" cameras, Electronic Field Production "EFP" cameras, or remote cameras. Remote cameras may be used or manipulated by production personnel or may be mounted on a person or device participating in the event, such as in a race car or a football player. Video and sensor signal outputs, are exemplified in a digital format. Alternative embodiments may be generated signals, such as the video stream and/or the sensor data, in analog and converted them to digital. Conversion might be performed internal to the camera or via an external device.

The computer generated graphic elements for each channel are mixed with each video stream at a synthesis stage in the real-time downstream processing system(s) 106-106'. Synthesis of the graphic and video information occurs for each channel downstream from the video acquisition, and with knowledge of the image formation characteristics gained from each cameras' instrumentation, or by analysis of the video stream and/or the image frames of the stream, described in more detail below.

Figure 2A:
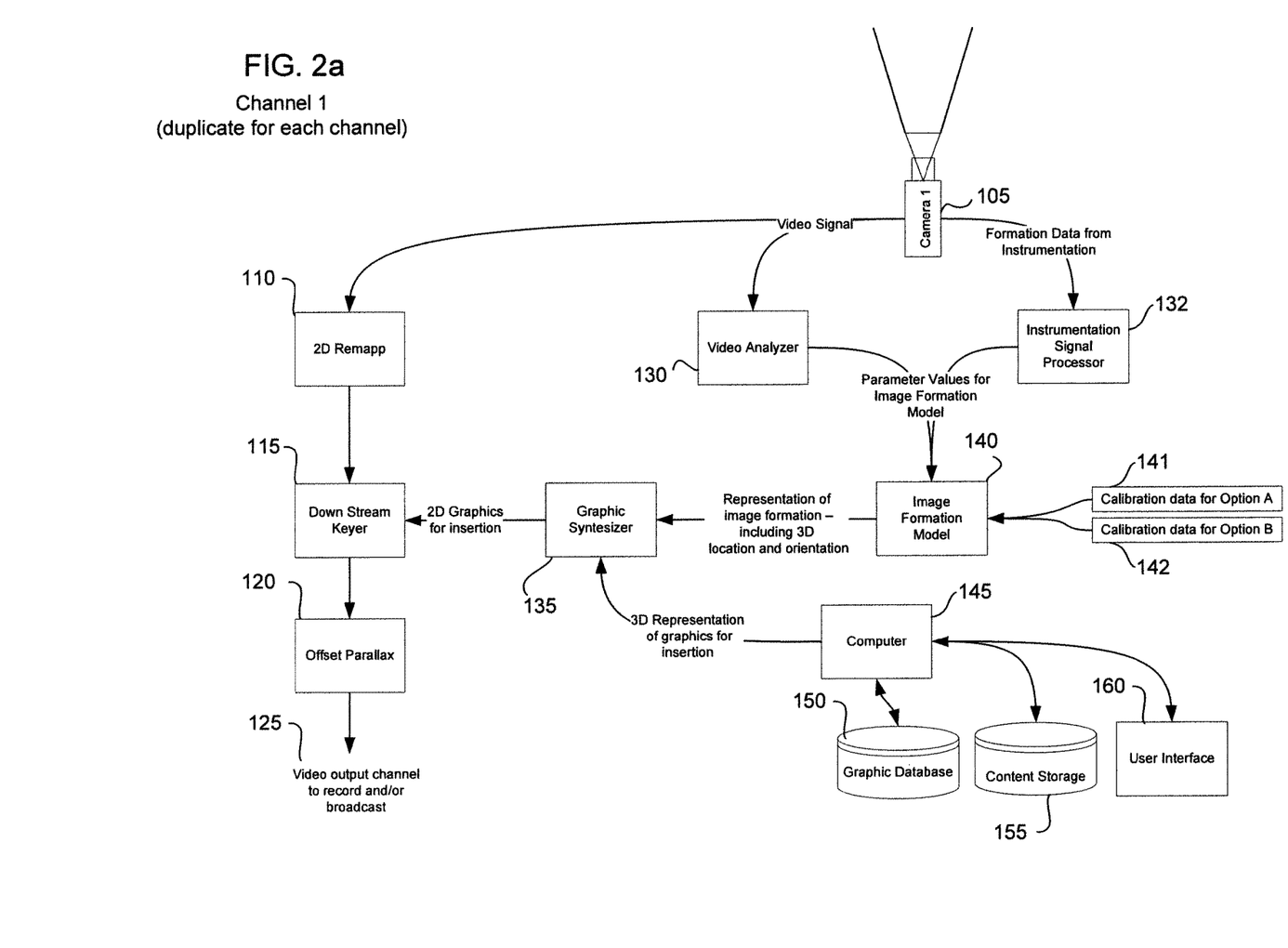
FIG. 2a is an exemplary block diagram of one channel of a multi-channel real-time three-dimensional video production system showing further detail.

FIG. 2a illustrates one possible embodiment system 100 employing one or more channels of a multi-channel system. Although only one channel is shown, a second camera in a stereoscopic real-time production system would perform in a similar manner described below. Additional cameras beyond the left and right cameras may perform the same or differently. In the depiction, a single channel of 3D stereoscopic content is acquired in real-time by a camera 105. The 2D representation of the 3D space is rendered by the camera and further processed, as described below. The inter-optical distance, that distance between one or more stereoscopic cameras 105-105', can be matched to the inter-ocular distance to create realistic 3D stereoscopic perception. Alternatively, the distance can be intentionally dissimilar to create unrealistic but dramatic effects for a viewer.

In the embodiment of FIG. 1, each camera channel is processed independently of other channels. Timing operations necessary for channel synchronization may share common timing signal resources, such as a central timing controller. It is envisioned that some or all of the video processing downstream of the cameras might be performed independent of the other channels and with the use of discrete devices for each channel.

In an alternative embodiment, processing is performed by combined devices, such that the left and right channel signals are separated internally within each device or subsystem and wherein processing is performed on equipment common to all channels, i.e. a multichannel system or subsystem. A further embodiment may use combined devices such that one or more discrete devices are implemented as modules in a combined device.

Devices may, as a further embodiment, be implemented as modules and these devices or modules may be implemented via software on a computer system, wherein the software is provided on a storage medium for use by one or more processors. The devices or modules may be further implemented in software as virtual devices and performed on a virtual device, wherein the devices may be configured or implemented on the fly. The production system 106-106' may also be embodied by a multi-computer processing system implemented on a distributed network or server system.

Communication between devices may be via wired connections or wireless connections. For example, a wireless connection might implement the 802.11n network protocol or some other radio network. Wired devices might use a tri-coaxial "triax", or fiber-optic cable connection implementing a digital protocol. In alternative embodiments, connections may involve analog signals communicated between devices using wired or wireless means. Connection type and data format may depend on specific interconnection requirements of each device or lack thereof, or upon the choice of the entity implementing the system described herein.

Real-time video data of the embodiment of FIG. 1 may be acquired frame-by-frame from camera 105 and transmitted to and received by a 2D Remapper 110 connected to the system, and simultaneously, if connected to the system, a Video Analyzer 130 for further processing in real time. The video stream for each video channel and camera, may be analyzed frame-by-frame by the Video Analyzer 130 to determine, and output, image formation data. Alternatively, or in conjunction with the Video Analyzer 130, instrumentation data from the camera 105 may be passed from the camera and/or camera instrumentation (not shown) to an Instrument Signal Processor 132 which may generate image formation data. The Video Analyzer 130 or the Instrument Signal Processor 132 may individually, or in combination with each other, provide Image Formation Model 140 image formation data.

In one embodiment, the Image Formation Model (IFM) 140 captures the formation data from the Video Analyzer. The resulting camera model represents all of relevant image formation characteristics where the camera model tracks the actual camera's image formation characteristics in real time. When there are any unnatural disparities in the video stream image(s) acquired or between the channels (caused, for example, by optical distortion, sensor misalignment or the effects of keystoning from camera toe-in) these will cause perceptual inconsistencies for the viewer of the stereoscopic video stream. The 2D ReMapper 110 corrects these disparities in the video streams. This 1) remedies the issues associated with the disparities in the video streams and 2) allows the graphic insertion to be generated with an idealized Image Formation Model. If, as an exemplary embodiment, the 2D ReMapper functionality is not employed, the Image Formation Model can represent the disparities so that the graphics have accurate correspondence to each channel of the video stream even though the video stream contains the associated disparities. Similarly, if the 2D ReMapper is being employed then the Image Formation Model may not include a representation of the disparities since the graphics are keyed into the video stream after the 2D ReMapper has modified the video stream to remove the disparities. Any errors between the virtual camera model and the actual camera can cause disparity between the graphic elements and the actual scene being shot which breaks the illusion of the graphic elements actually being a part of the real scene. Because of the potential errors, insertion of the graphics into traditional 2D live action video requires precise correspondence between the graphic elements and the scene viewed by the camera. The graphic elements are generated by a virtual camera whose image formation properties match those of the real camera creating the video frame-by-frame. For a three dimensional representation, each camera creates a two dimensional image from a three dimensional scene. The description of the manner in which each camera transforms points from the three dimensional world to points on the two dimensional image pane is referred to as the Image Formation Model (IFM) 140.

Figure 3:
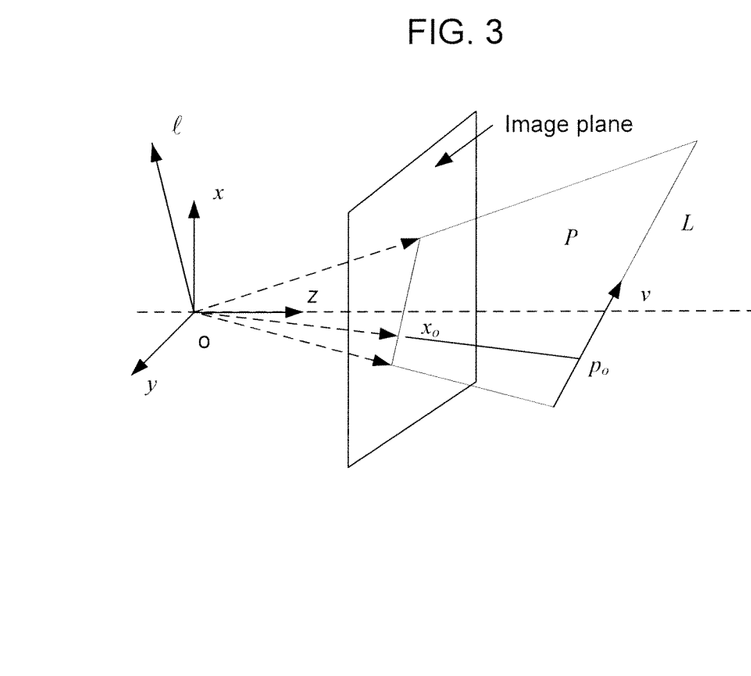
FIG. 3 is an exemplary diagram of a visual perspective relative to an image plane.

The Image Formation Model comprises a defined mathematical model combined with parameters of the model. It may be further described as a mathematical model of the camera's projective transformation and describes the transformation of points by the camera from the three dimensional world to points on the two dimensional image plane. Points in the three dimensional world can be described by their coordinates in a three dimensional rectilinear coordinate reference frame as in FIG. 3. The points on the image plane can be described by their coordinates in a two dimensional rectilinear coordinate reference frame. The Image Formation Model 140 allows the computation of the two dimensional image coordinates of the point on the image plane that corresponds to a three dimensional point being viewed by the camera. With this information, computer generated images of objects in three dimensional space are generated and inserted into the video stream in a manner that ensures the accurate correspondence between the computer generated "CG" graphics and the real three dimension world.

Further to the present embodiment, the form of the mathematical model, which represents the Image Formation Model 140 of FIG. 1, is parameterized by analysis of the streaming video signal and/or the camera instrumentation. The Image Formation Model is parameterized (image formation data) in terms of the camera location in the three dimensional coordinate reference frame (Xcamera, Ycamera, Zcamera), the camera's orientation with respect to the axes of the coordinate reference frame (theta-x, theta-y, theta-z), the focal length of the lens (f) and the principle point (xp, yp). It may be necessary to also incorporate into the image formation attributes the scale factors in the x and y focal plane (xs, ys), the skew of the camera's focal plane with respect to the optical center line ($\Theta$x-skew, $\Theta$y-skew) and the optical distortion. The parameterization of the optical distortion depends on the model used for its representation. Optical distortion can be described by the first two terms of a series expansion of the radial distortion which requires two parameters which are the coefficients of the mathematical expression.

In one embodiment, formation attributes may be further augmented by addition of one, or a combination of more than one, calibrations. Calibration data 141 can be applied to Video Analyzer 130 formation data derived from the video stream. Calibration of the Instrument Signal Processor 132 formation data may be gained from calibration data 142. Results of the calibration process can be used at the Image Formation Model 140. An alternative embodiment may use the calibration results prior to the Formation Model in an upstream device. Alternatively, the calibration can be used at the Graphic Synthesizer or at an intermediate device. As described above, the real time source of data may be from video analysis results of a Video Analyzer 130 processing the stream in real time, or from instrumentation via an Instrument Signal Processor 132 connected to the camera 105 instrumentation and the Image Formation Model 140, by which instrumentation data from the camera 105 is passed.

In an alternative embodiment, image formation data for the Image Formation Model 140 may be gained from instrumentation (not shown) directly tied or attached to the camera 105 mounting hardware or camera itself. Such data can include position and orientation information (such as theta-x, theta-y, theta-z,X,Y and Z information) relative to a real world coordinate system. Further, the data can include information pertaining to the lens and lens settings such as focal length, focal point, focal distance, and aperture. More information may include timing signals generated by the camera 105 or an external source such as a timing/synchronization controller (not shown). As with the video analysis method previously described, the Image Formation Model is parameterized in terms of the camera location in the three dimensional coordinate reference frame (Xcamera, Ycamera, Zcamera, the camera's orientation with respect to the axis of the coordinate reference frame (theta-x, theta-y, theta-z), the focal length of the lens (f) and the principle point (xp, yp)). It may be necessary to also incorporate into the parameters the scale factors in the x and y focal plane (xs, ys), the skew of the camera's focal plane with respect to the optical center line ($\Theta$x-skew, $\Theta$y-skew) and the optical distortion.

Instrumentation may be connected to or associated with an Instrument Signal Processor 132 for further manipulation or enhancement of the data acceptable to the Image Formation Model, such as might be necessary to convert any signal. Data from the camera instrumentation, for example, may be one or more analog signals requiring conversion into a digital signal format for use by the Image Formation Model 140. Alternatively, data from the camera instrumentation may, for example, be in a digital format having protocol, or formatting specification, incompatible with the Image Formation Model 140. At the Image Formation Model 140, formation data gathered from the camera instrumentation, similar to the data from the Video Analyzer 130, is acquired and formatted into a mathematical model bearing location, orientation and other formation representations, including those previously described.

Image Formation Model 140 provides a mathematical representation of image formation to a Graphic Synthesizer 135 connected to the system for combining with the graphical elements. Graphical element may be stored and retrieved from a Graphic Database 150 connected to the system, by way of a system Computer 145, or from the system Computer 145 directly. The Graphical Database 150, and thus the 3D model of graphical elements may be shared among the multiple channels. The 3D models of graphics are parameterized to allow orientation relative to the formation data from the Image Formation Model 140.

3D representation of graphic elements in the form of models from the Computer 145 and Graphic Database 150, are combined in real time at the Graphic Synthesizer 135, rendering a 2D image from the 3D model using a projective transformation defined and provided by the Image Formation Model 140. This can be performed by a programmable graphics pipeline (not shown). The projective transform, defined by the Image Formation Model 140, is used by the graphics pipeline to render 2D video from the 3D model of the graphics.

Once rendered, the 2D video signal is capable of being inserted into the video stream that matches the video content frame-by-frame. The graphic may be a static or dynamic model sent to and received by the Graphic Synthesizer 135 from the Computer 145 for incorporation. Combining the graphic models with the real-time image formation model transforms the graphic elements into a graphic modeled to match the 2D image and 3D scene acquired in the video stream, such that the graphics have proper orientation and layout arrangement to conform to the perceived 3D real world. As previously described, representation of image formation may include multi dimensional location and orientation information relevant to the scene acquired by the camera in each successive video image frame and processed either from the video image stream via the Video Analyzer 130 or from the camera 105 instrumentation.

The Graphic Database 150, stores graphical models for use in video streams. The graphic models are 3D representations of graphical elements intended for insertion into a video image. In an embodiment, graphical elements, as received from the database, have not yet been combined with the formation information gathered from the camera's Instrument Signal Processor 132 or Video Analyzer 130. In an alternative embodiment, the graphical elements, combined with the formation data can be stored in the database and later retrieved.

When the computer itself, or by way of instructions received from a user at the user interface, indicates graphic elements are to be inserted into a video stream, the computer retrieves the graphic model from the graphic database. Additional data may be retrieved from Content Storage 155 and used by the Graphic Synthesizer 135 or by the computer 145 to assist with use of the graphical element, formation data or the process of combining. Alternative content generated by, or as a result of the Graphic Database, may be stored in a Content Storage 155, where a user through the User Interface 160 may retrieve the content. In the case of user manipulated graphic elements, the Graphic Database, as well as the Content Storage 155, may be called upon to provide information to the computer to facilitate the user's commands to manipulate one or more graphic elements. An exemplary graphic element is one allowing the user at the user interface 160 to draw on the image, or give the appearance of doing so to the end viewer. Graphic Database 150 and Content Storage 155 might receive graphic elements and content from the user via the computer or from an external means, not shown.

In addition to the description above, the User Interface 160 may provide a means for a user to interact with the system, including the creation of graphic elements, and management of the graphical models, content storage and user access. The User Interface 160 may also allow a user to interface with one or more devices within the system. This may include, without limitation, the Graphic Synthesizer 135, the Image Formation Model 140, the Video Analyzer 130 and the Down Stream Keyer 115, or the system as a whole.

Whether by direct instruction of a user at the User Interface or by the Computer managing the graphic elements, one or more 3D representations of graphic elements are obtained by Graphic Synthesizer 135 and synthesized with formation data into a 2D graphic for insertion into the video steam. The Graphic Synthesizer constitutes a virtual camera generating graphic elements whose image formation properties match those of the real camera creating the video.

Each of the virtual camera models matches the locations, orientations, and optical magnifications of the real cameras. The virtual cameras also match the real camera image formation characteristics acquired in the video stream from camera 105 which include optical distortion (typically radial distortion), image sensor mounting in the cameras relative to the optics (typically tangential distortion), accurate modeling of kinematics of camera mounting and control and systematic measurement errors in the instrumentation of the camera kinematics and optics. Any errors in modeling and representation of these characteristic can result in shifting or scaling of graphics relative to the actual scene.

In one embodiment, a 2D Remapper 110 is incorporated into the system. The 2D Remapper 110 device corrects adverse image formation characteristics of the cameras. Distortion impact applies to stereoscopic viewing whether or not graphics are being inserted into the video stream. The perspective views of two horizontally displaced cameras exhibit some degree of keystone effect which causes vertical and horizontal disparity. Increases of displacement and toe-in raise the vertical disparity. These distortions, such as keystoning and optical distortion can adversely effect the viewing experience and make the viewer uncomfortable due to the relative misalignments of the left and right images. Correction of the effects by the 2D Remapper placed in the video stream alleviates the need of the Image Formation Model, which controls the manner in which the graphics are created by the Graphic Synthesizer, to represent and match the effect in the graphic synthesis process. Image formation characteristics encountered by the 2D Remapper are represented by a mathematical model. Although similar to the Image Formation Model, that of the 2D Remapper only represents the characteristics for which the Remapper is providing compensation. The inverse of the model is applied to define the remapping so that the resultant video has been corrected.

The Graphic Synthesizer 135 containing the synthesized 2D video signal of the 2D graphics, and the 2D Remapper 110 containing the video stream data frame(s) acquired by the Camera 105, are connected to a Downstream Keyer (DSK) 115 where incorporation of the 2D graphic video signal into the video stream takes place. The Downstream Keyer 115 accepts the acquired video stream via the 2D Remapper 110 and the 2D graphic video signal from the Graphic Synthesizer and joins them in a multi-step process. The Downstream Keyer 115, combines the background video stream from 2D ReMapper 110, if employed, with the Graphic Synthesizer 135 foreground video stream. The output of the keyer is a combination of the foreground and background video signals in which an alpha channel, provided by the Graphic Synthesizer 135 is controlling the degree of transparency on a pixel by pixel basis. The keyer may also use the background video to determine a second alpha channel for use in keying. This second alpha channel may, for example, be a chromakey or a luminance key. Variations of these techniques that may also be employed by the keyer. The resulting image thus combines the graphic with the video image. Changes to the video image frame as a result of time and changing content, can change the graphic inserted into the image to reflect the changing content. For example, graphics inserted in the video stream to give the appearance they are on a sporting event surface can change as the perspective of the video content changes; such as might occur when the camera is panned. In an alternative embodiment, the 2D Remapper 110 is not present, leaving the Keyer 115 directly connected to the camera 105.

The Downstream Keyer 115 may be connected to an Offset Parallax module 120 which offsets the combined image to correct for parallax derived from the separation of the cameras 105-105' from each other. The Offset Parallax module outputs the completed video stream containing the acquired image from the camera 105 and the graphic element desired. The video output from the channel can be recorded and/or broadcast in concert with the additional channel(s) to form the stereoscopic video image stream at the viewer's presentation screen.

Figure 2B:
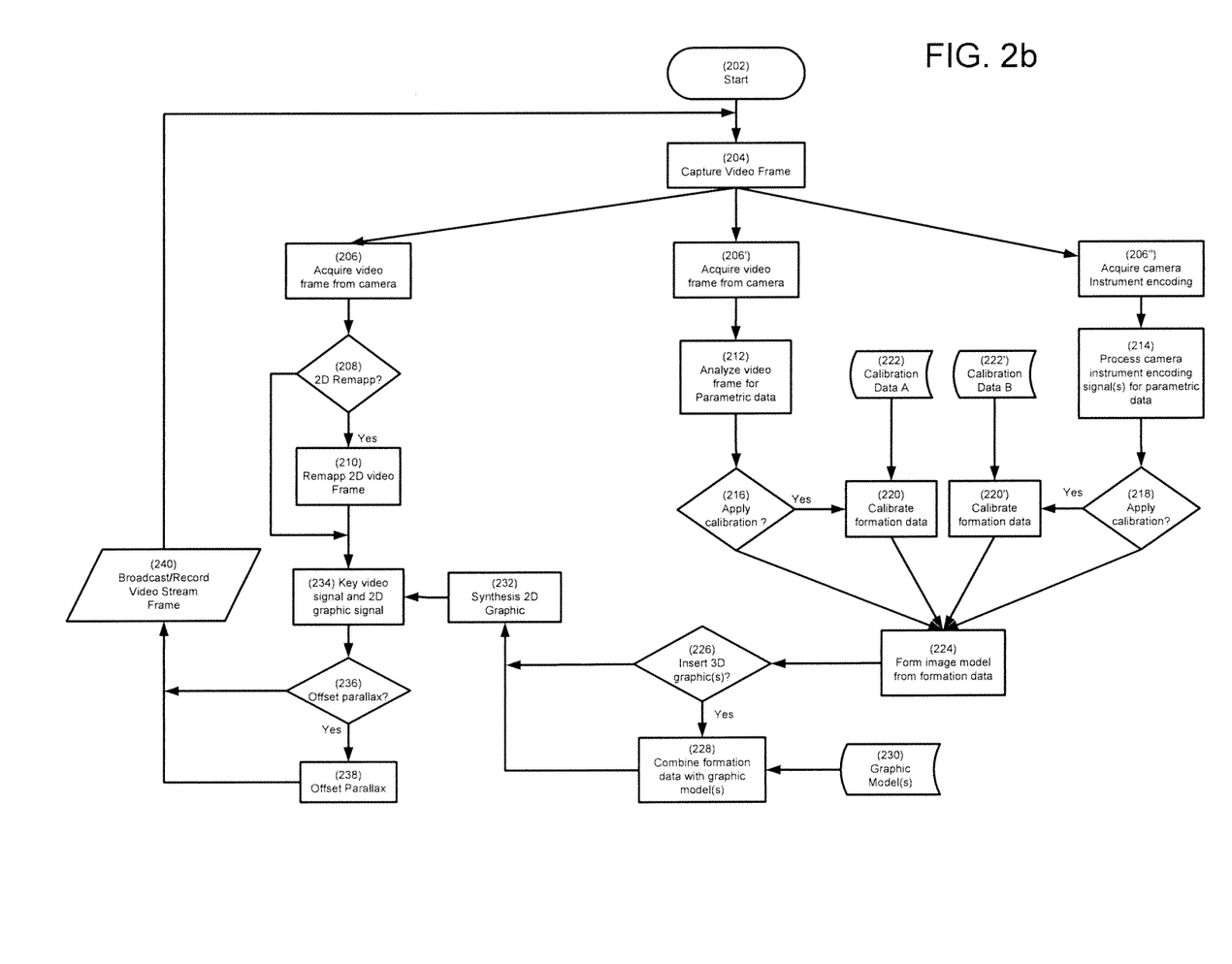
FIG. 2b is an exemplary flowchart diagram of one channel of a multi-channel real-time three dimensional video production system.

FIG. 2b illustrates one embodiment of a real-time graphic insertion process for one of two or more channels of a system embodied in FIG. 2a. The second and/or subsequent channels would be processed in parallel with the first, resulting in video streams for each channel of the 3D broadcast in synch with each other. Step 202 starts the process of acquiring and processing live a real-time video stream for the insertion of graphical elements. Step 204 acquires, via a camera 105, a video frame image 'I' to be acquired at Steps 206, 206' for further processing of the frame image. Steps 206, 206' and 260" occur simultaneously. Step 208 determines if a 2D Remapping is to occur based on user discretion and/or the image formation characteristics and their degree of severity. For example, optical distortion caused by the lens, camera sensor skew and keystone effects might require correction or compensation. If the remapping is to occur at a 2D Remapper 110, step 210 will be performed. Otherwise, the 2D Remapping step 210 is bypassed. Step 234 combines the video stream of the preceding steps with the synthesized graphics at Keyer 115 whereby the video frame processed by preceding steps is matched by the parallel processed graphic manipulation resulting from steps following Steps 206' and/or 206".

As stated, steps 206' and 206" are performed in parallel with steps (206, 208, 210) manipulating the video stream. A Video Analyzer, at Step 206', acquires the video frame 'I'. The analyzer then at step 212 analyzes the video frame image to compute the image formation data for the Image Formation Model 140, as previously discussed. Image formation data is also computed from instrumentation comprising, camera position, orientation and lens settings; wherein at step 206" the instrumentation encoding is acquired. This acquiring process can be performed by the camera instruments themselves or by the Instrument Signal Processor 132. Step 214 configures the instrumentation signals from the camera 105 instruments, computing the image formation data by an alternative means. The image formation data derived from video analysis or from instrumentation, constitute parameters which define a specific instance of the Image Formation Model 140 at a specific moment in time. In one embodiment, both forms of formation data contribute to the Image Formation Model. In alternative embodiments, only one might be selected.

If at steps 216 and steps 218 it is determined that calibration of the formation data is required, step 220 and/or 220' are performed. Separate from the real-time parameter data, there is also static calibration data, steps 222 and 222', for each parameterization process. Calibration, if applied is performed at step 220 and 220', which can be performed outside the Image Formation Model, or within. Forming the image model at step 224 combines all that is known about the scene in relation to the camera position and orientation characteristics. The Image Formation Model may be comprised of a predefined mathematical model combined with the parameter of the model. The parameters may be determined by a combination of the calibration process and a real-time source of data, i.e. video analysis and camera instrumentation. The presence of a 3D graphics model 230 to insert or by the indication from an operator can determine if, at step 226, graphics combined with the formation data of the Image Formation Model, are to be incorporated within the video frame image. Graphic Synthesizer 135 may perform the steps 226 and 228 internally. Combining the formation data of the Image Formation Model and the 3D representation of graphics for insertion computes a model unique to the present frame and the camera from which is was acquired, taking into account camera location, orientation and time varying inter-axial camera spacing and camera angles including toe-in angles. Step 232 synthesizes the model into a 2D Graphic matched to the image frame 'I' at the Keyer 115. Step 234 combines the previously separate, but parallel, processes bringing the video of steps 208-210 together with the 2D graphic synthesized at 232 and matched to the video frame. The Keyer step 234 incorporates the 2D graphic into the image frame. If parallax offsetting is determined to be necessary at step 236, the process is performed at step 238. Otherwise, the now enhanced video frame image is, at step 240, broadcast, recorded or both. Thereafter the process steps repeat for the next and each subsequent video image frame acquired by the camera, for each camera.

Statement Regarding Preferred Embodiments

While the invention has been described with respect to the foregoing, those skilled in the art will readily appreciate that various changes and/or modifications can be made to the invention without departing from the spirit or scope of the invention as defined by the appended claims.

What is claimed is:

1. A method of inserting a 3D graphic element into a 3D stereoscopic image generated from two cameras disposed on a camera rig, and compensating for optical effects of the camera rig, comprising:
    acquiring a first 2D video image frame captured by a first camera, the first camera being one of the cameras on the camera rig;
    acquiring first camera instrumentation data associated with the capture of the first 2D video image frame by the first camera;
    acquiring camera rig information associated with the camera rig;
    calculating one or more "unnatural disparities" associated with at least one of the first camera and the camera rig, based on the camera rig information including camera toe-in angle and camera separation, and at least one of the first camera instrumentation data and the first 2D video image frame, the "unnatural disparities" comprising at least a keystoning effect;
    adjusting the first 2D image frame based on the "unnatural disparities," and providing a first adjusted 2D image;
    converting the 3D graphic element to a first adjusted 2D graphic element using a first virtual camera graphic synthesizer that models imaging of the first camera using a first image formation model, the first image formation model using first camera parameter values derived from at least one of the first camera instrumentation data and the first 2D video image frame; and
    incorporating the first adjusted 2D graphic element into the first adjusted 2D image frame to generate a first combined video image frame.

2. The method of claim 1, wherein the "unnatural disparities" further comprises at least one of radial distortion and tangential distortion.

3. The method of claim 1, wherein the converting the 3D graphic element to a first adjusted 2D graphic element, comprises adjusting for at least one of radial distortion and tangential distortion, associated with the first camera.

4. The method of claim 1, wherein the converting the 3D graphic element to a first adjusted 2D graphic element, further comprises adjusting for a first distortion associated with the first camera to the extent that the first adjusted 2D image based on the unnatural disparities did not adjust for the first distortion.

5. The method of claim 4, wherein the first distortion is at least one of radial distortion and tangential distortion.

6. The method of claim 1, wherein the first image formation model does not correct for the keystoning effect.

7. The method of claim 1, further comprising calculating the first camera parameter values using at least one of: first video analysis of the 2D video image frame, and first signal processing of the first camera instrumentation data.

8. The method of claim 1, wherein the camera rig comprises more than two cameras.

9. The method of claim 1, further comprising:
acquiring a second 2D video image frame captured by a second camera, the second camera being another one of the cameras on the camera rig;
acquiring second camera instrumentation data associated with the capture of the second 2D video image frame by the camera;
calculating one or more "unnatural disparities" associated with at least one of the second camera and the camera rig, based on the camera rig information including camera toe-in angle and camera separation, and at least one of the second camera instrumentation data and the second 2D video image frame, the "unnatural disparities" comprising at least a keystoning effect;
adjusting the second 2D image frame based on the "unnatural disparities," and providing a second adjusted 2D image;
converting the 3D graphic element to a second adjusted 2D graphic element using a second virtual camera graphic synthesizer that models imaging of the second camera using a second image formation model, the second image formation model using second camera parameter values derived from at least one of the second camera instrumentation data and the second 2D video image frame; and
incorporating the adjusted 2D graphic element into the adjusted 2D image frame to generate a second combined video image frame.

10. The method of claim 9, further comprising providing a two channel video signal indicative of the first combined video image frame and the second combined video image frame, and wherein the first combined video image frame and the second combined video image frame are captured simultaneously.

11. The method of claim 9, further comprising correcting the first combined video image frame and the second combined video image frame for offset parallax based at least on the camera rig information.

12. A system for inserting a 3D graphic element into a 3D stereoscopic image generated from two cameras disposed on a camera rig, the camera rig having camera rig information associated with the camera rig, and compensating for optical effects of the camera rig, comprising:
a first camera, configured to capture a first 2D video image frame, the first camera being one of the cameras on the camera rig, the first camera providing first camera instrumentation data associated with the capture of the first 2D video image frame by the first camera;
a first 2D remapper configured to calculate one or more "unnatural disparities" associated with at least one of the first camera and the camera rig, based on the camera rig information including camera toe-in angle and camera separation, and at least one of the first camera instrumentation data and the first 2D video image frame, the "unnatural disparities" comprising at least a keystoning effect, and configured to adjust the first 2D image frame based on the "unnatural disparities," the remapper providing a first adjusted 2D image;
a first virtual camera graphic synthesizer configured to convert the 3D graphic element to a first adjusted 2D graphic element, the synthesizer arranged to model imaging of the first camera using a first image formation model, the first image formation model using first camera parameter values derived from at least one of the first camera instrumentation data and the first 2D video image frame; and
a first keyer configured to incorporate the first adjusted 2D graphic element into the first adjusted 2D image frame to generate a first combined video image frame.

13. The system of claim 12, wherein the "unnatural disparities" further comprises at least one of radial distortion and tangential distortion.

14. The system of claim 12, wherein the synthesizer is configured to adjust for at least one of radial distortion and tangential distortion, associated with the first camera.

15. The system of claim 12, wherein the synthesizer is further configured to adjust for a first distortion associated with the first camera to the extent that the first adjusted 2D image based on the unnatural disparities did not adjust for the first distortion.

16. The system of claim 15, wherein the first distortion is at least one of radial distortion and tangential distortion.

17. The system of claim 12, wherein the first image formation model does not correct for the keystoning effect.

18. The system of claim 12, wherein the synthesizer is configured to calculate the first camera parameter values using at least one of: first video analysis of the 2D video image frame, and first signal processing of the first camera instrumentation data.

19. The system of claim 12, wherein the camera rig comprises more than two cameras.

20. The system of claim 12, further comprising:
a second camera, configured to capture a second 2D video image frame, the second camera being another of the cameras on the camera rig, the second camera providing second camera instrumentation data associated with the capture of the second 2D video image frame;
a second 2D remapper configured to calculate one or more "unnatural disparities" associated with at least one of the second camera and the camera rig, based on camera rig information including camera toe-in angle and camera separation, and at least one of the second camera instrumentation data and the second 2D video image frame, the "unnatural disparities" comprising at least a keystoning effect, and configured to adjust the second 2D image frame based on the "unnatural disparities," the remapper providing a second adjusted 2D image;
a second virtual camera graphic synthesizer configured to convert the 3D graphic element to a second adjusted 2D graphic element, the synthesizer arranged to model imaging of the second camera using a second image formation model, the second image formation model using second camera parameter values derived from at least one of the second camera instrumentation data and the second 2D video image frame; and
a second keyer configured to incorporate the second adjusted 2D graphic element into the second adjusted 2D image frame to generate a second combined video image frame.

21. The system of claim 20, further comprising logic configured to provide a two channel video signal indicative of the first combined video image frame and the second combined video image frame, and wherein the first combined video image frame and the second combined video image frame are acquired simultaneously.

22. The system of claim 20, further comprising offset parallax logic configured to correct the first combined video image frame and the second combined video image frame for offset parallax based at least on the camera rig information.

\* \* \* \* \*